United States Patent
Guan et al.

(10) Patent No.: US 11,093,568 B2
(45) Date of Patent: Aug. 17, 2021

(54) SYSTEMS AND METHODS FOR CONTENT MANAGEMENT

(71) Applicant: Accenture Global Solutions Limited, Dublin (IE)

(72) Inventors: Lan Guan, Johns Creek, GA (US); Neeraj D. Vadhan, Los Altos, CA (US); Aiperi Iusupova, Chicago, IL (US); Madhusudhan Srivatsa Chakravarthi, Lisbon (PT); Lana Grimes, St. Catharines (CA); Mannbir Singh, New Delhi (IN); Ajit Ferrao, Quezon (PH); Nilesh Shinde, Thane (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/926,487

(22) Filed: Jul. 10, 2020

(65) Prior Publication Data
US 2021/0011961 A1 Jan. 14, 2021

Related U.S. Application Data

(60) Provisional application No. 62/872,783, filed on Jul. 11, 2019.

(51) Int. Cl.
*G06F 16/90* (2019.01)
*G06F 16/9535* (2019.01)
(Continued)

(52) U.S. Cl.
CPC ...... *G06F 16/9535* (2019.01); *G06F 3/04842* (2013.01); *G06F 16/24578* (2019.01); *G06F 16/9538* (2019.01)

(58) Field of Classification Search
None
See application file for complete search history.

(56) References Cited

U.S. PATENT DOCUMENTS

2015/0149494 A1* 5/2015 Jason ...................... G06F 16/24
707/758
2016/0359791 A1* 12/2016 Zhang .................. H04L 51/046
(Continued)

OTHER PUBLICATIONS

Sievert et al., "LDAvis: A method for visualizing and interpreting topics," Proceedings of the Workshop on Interactive Language Learning, Visualization, and Interfaces, Jun. 27, 2014, pp. 63-70, Baltimore, Maryland, USA. Retrieved Jul. 3, 2020 from Internet: <https://www.aclweb.org/anthology/W14-3110/>.
(Continued)

*Primary Examiner* — Belix M Ortiz Ditren
(74) *Attorney, Agent, or Firm* — Plumsea Law Group, LLC

(57) ABSTRACT

Systems and methods for content management are disclosed. A content management system may include a data sourcing and data streaming engine configured to aggregate content data from data sources, a trend detection and monitoring engine configured to match data sources with content management metadata and to provide relevance scoring of the content data, and a trend recommendation and visualization engine configured to present to a user (e.g., content reviewer or subject matter expert), through a graphical user interface, an output comprising a relevance score and relevant trend, topic, and/or data source information, and to receive from the user through the graphical user interface input and/or activity. The data sourcing and data streaming engine, the trend detection and monitoring engine, and/or the trend recommendation and visualization engine may be updated with the input and/or activity for processing subsequent content data.

14 Claims, 12 Drawing Sheets

(51) Int. Cl.
G06F 16/2457 (2019.01)
G06F 16/9538 (2019.01)
G06F 3/0484 (2013.01)

(56) References Cited

U.S. PATENT DOCUMENTS

2019/0026601 A1  1/2019  Packalen et al.
2019/0108416 A1  4/2019  Freger et al.

OTHER PUBLICATIONS

"Visualising topics as distributions over words," (pp. 1). Retrieved Jul. 10, 2020 from Internet: <http://bl.ocks.org/AlessandraSozzi/raw/ce1ace56e4aed6f2d614ae2243aab5a5/#topic=1&lambda=1&term=environmental>.
Extended European Search Report dated Sep. 28, 2020 for European Patent Application No. EP20185544.2.
Examination Report dated Feb. 9, 2021, in European Patent Application No. EP20185544.2.
Response to Written Opinion of the European Search Report, dated Jan. 8, 2021, in European Patent Application No. EP20185544.2.

* cited by examiner

| | |
|---|---|
| Content ID: | 0394AI07 |
| Content Type: | Photo |
| Work Type: | English US |
| Trend/Topic Advisor | |
| Trend ID: | AI039407 |
| Trend Correlation Score: | 0-100% |
| Trend Relevance Score: | 0-100% |
| Trend Virality Score: | 0-100% |
| Trend Velocity Score: | 0-100% |
| Trend Shelf Life: | Days |
| Trend Status: | Red, Amber, Green |
| Trend Category: | Unscheduled Event |
| Trend Tags: | Politics, Community, Culture, LGBTQ Rights |
| Data Source Title: | Oklahoma man supports LGBTQ Pride month with message on his truck: "Not all country boys are bigots" |
| Data Source Description: | John Doe lives in a rural town in Oklahoma, not the place many would typically associate with Pride month. |
| Data Source Hyperlink: | https://www.cbsnews.com/news/pride-truck-oklahoma-man-supports-lgbtq-pride-month-with-viral-message-on-his-truck/# |
| Data Source Category: | National |
| Data Source Type: | External News Sites |
| Suggested Policy Violations: | Hate Speech, Bullying |
| Date & Time Updated: | 2019-06-12 09:19:15.8900000 |
| Volume Impact Score | 1-5 |
| Efficiency Impact Score | 1-5 |
| Effectiveness Impact Score | 1-5 |
| Wellness Impact Score | 1-5 |
| Repercussion Score: | 1-5 |
| Priority Score | 1-5 |
| Notes: | LGBTQ community his support in a very unique way |

SME Trend Advisory

File  Edit  Settings  Help

CONTENT

| Trend Name | Florida, Drugs, Arrest, Animals |
| Alert Category | Sensitive Subjects |
| Relevance Score | 98.6 % |
| Data Source Name | News Station A |
| Trend Description | A Florida man arrested for drugging alligators... |
| | A Florida man has been arrested after authorities report he was administering illegal street drugs to alligators ... |

Approve   Delete   Next >

Relevant   Not Relevant   Next >

SME Topic Advisory
File  Edit  Settings  Help

CONTENT

Topic Name: Florida, Drugs, Arrest, Animals
Alert Category: Sensitive Subjects
Relevance Score: 98.5%
Data Source Name: News Station A
Topic Description: A Florida man arrested for drugging alligators...

A Florida man has been arrested after authorities report he was administering illegal street drugs to alligators ...

Approve   Delete   Next >

Relevant   Not Relevant   Next >

SYSTEMS AND METHODS FOR CONTENT MANAGEMENT

CROSS-REFERENCE TO RELATED APPLICATION(S)

This application claims the benefit of U.S. Provisional Patent Application No. 62/872,783, filed Jul. 11, 2019, which is herein incorporated by reference in its entirety.

TECHNICAL FIELD

The present disclosure generally relates to operation center environments, including content management services. More specifically, the present disclosure generally relates to systems and methods for advising content reviewers during content managing activities, and for managing and updating recommendations for the content reviewers. Even more specifically, the present disclosure generally relates to an operations service platform that, in real-time, detects and monitors trends, topics, and data sources, and based on that information, provides recommendations in support of content management activities.

BACKGROUND

Content management services monitor user-generated submissions to an online content distributor (e.g., social media and blogging sites) and apply rules to determine whether the submissions are accepted and distributed (e.g., in a post). The large volume of submissions and the constantly changing definitions of objectionable content present challenges in accurately and quickly processing submissions without negatively impacting the functions of an online content distributor. Conventional content management techniques have relied heavily on individual human content reviewers, who often must render decisions on content without having the most up to date information associated with the content, and without the benefit of the experiences and decisions of other reviewers. To assist the individual content reviewers, conventional content management centers spend considerable time and resources on trend research focus groups and on intensive research efforts, to extract useful information on events, news, and trends that affect content management decisions. Marshalling such information and effectively communicating it to the content reviewers can be a slow and costly endeavor.

The conventional content management techniques have typically relied on three stages, including monitoring, tracking, and communication. In the monitoring stage, content management teams manually (e.g., by online searches by individual human agents) follow and search events at a set periodic basis and check for relevant news updates. The teams search for news and trends using keywords/phrases that are known to be associated with potential violations of content management policies, such as hate language, violence, and nudity. Teams also make note of trends and topics that are seen in content management queues. Teams huddle for weekly in-person meetings to discuss events and trends seen in the news and content management queues. Teams are assigned to identify and monitor planned and unplanned events and trends, and to identify and monitor trends within content management queues. These monitoring steps rely on human observations, which can be inaccurate (e.g., a human may inadvertently overlook text/images and/or may have flawed perception of trends) and biased. These inaccuracies and biases trickle down to the subsequent stages of manual content management.

In the tracking stage, teams manually aggregate (e.g., by spreadsheets or database populated by human agents) unplanned and planned events and trends for further validation and prioritization based on the importance and prevalence of identified trends and events. Teams obtain approval to communicate aggregated events and trends for further communication with agents.

In the communicating stage, teams alert agents about planned, unplanned events, and trends via email communications to help the agents gain contextual information on assigned content volume. Teams share reporting on planned and unplanned events during team huddles, client business reviews, leadership checkpoints, and newsletters. Agents are notified by a team about events and trends that might impact their content management work types.

Accordingly, at each stage of that manual content management approach, input from human agents is required, thereby introducing many opportunities for inefficiencies, inaccuracies, and biases. In addition, the data sources used throughout the monitoring, tracking, and communicating stages are limited by the capacity of human agents, as teams must manually source and analyze events, events, trends, topics and news that are relevant to content management activities. As such, human agents can feasibly manage only a handful of sources, such as Daily Mail™, CNN™, Fox News™, Al-Jazeera™, and New York Times™. There are many more (10,000+) public data sources—spanning social media, web forums, blogs, local media, the deep/dark web, and public sensor data—which manual approaches are not capable of accurately processing. In addition, manual approaches cannot process and cross-correlate an expanding variety of data types and formats, including text in multiple languages, images, video, sound, and streaming machine data from sensors, and cannot instantaneously process and ingest real-time social media data feeds along with the text of the public social media post, and other varieties of public data fields attached to each post, totaling billions of real-time signals a day.

Even content management techniques that incorporate computer-based tools, such as tracking spreadsheets and databases, fail to capture ongoing managing activity information and use the same data gathering techniques, which can deplete computing resources.

Accordingly, there is a need in the art for systems and methods for efficiently and effectively managing content.

SUMMARY

Systems and methods for content management are disclosed. The content management systems and methods solve the problems discussed above using an operations real-time trend, topic, and data source detection, monitoring, and recommendation service platform. The systems and methods may provide content management centers with operation channels through which content management entities can monitor, track, and manage the trends and signals impacting their content management activities; can monitor, track, and manage metrics, such as content volume, average handling time, quality of content review, and reviewer performance; can provide critical feedback on relevancy of trend, topic, and data source recommendations, which may be used to improve the processing of subsequent content; and based on the improved trend, topic, and data source recommendations, can provide more efficient and accurate systems and methods for preventing objectionable content from being published or distributed. In addition to handling various content management requests, embodiments may compile useful information on events, news, and trends, using processes automated with sophisticated algorithmic machine-learning methods and computations to process signals impacting their content management activities. The content management systems and methods may improve the efficiency and effectiveness of content management activities, resulting in reduced operational costs and computing demand, and more successful processes, such as better content handling time, content review quality, and reviewer performance.

The content management systems and methods further solve the problems discussed above by providing systems and methods for improving content management performance, such as integrating real-time trend surveillance using statistical keyword-based scoring and machine-learning topic modeling classification algorithms that present content reviewers with information and trends useful to handling content monitoring and decisioning in their assigned content backlogs. In some implementations, semantically-based content analytics and score-based classification techniques may be applied to the process of real-time trend analysis to identify keywords and/or phrases of relevance, based on which news articles, events, and information signals from other third-party API and data sources can be selectively presented to content reviewers to drive more efficient content management processes.

In one aspect, the disclosure provides a content management system that may include a data sourcing and data streaming engine configured to aggregate content data from data sources, a trend detection and monitoring engine configured to match data sources with content management metadata and to provide relevance scoring of the content data, and a trend recommendation and visualization engine configured to present to a user, through a graphical user interface, an output comprising a relevance score and relevant trend, topic, and/or data source information, and to receive from the user through the graphical user interface input and/or activity. The data sourcing and data streaming engine, the trend detection and monitoring engine, and/or the trend recommendation and visualization engine may be updated with the input and/or activity for processing subsequent content data.

In an embodiment, the output presented by the trend recommendation and visualization engine through the graphical user interface may comprise a content management display in which information about content being reviewed is displayed, a suggested trend/topic display, and a visualization display. The suggested trend/topic display may be configured to display the relevance score and the relevant trend, topic, and/or data source information and to provide an input tool for receiving the input and/or activity from the user. The relevance score and the relevant trend, topic, and/or data source information may be associated with the content being reviewed. The visualization display may be configured to display a visualization of the relevance score and the relevant trend, topic, and/or data source information associated with the content being reviewed.

In an embodiment, the information about content being reviewed may include metadata of the content being reviewed.

In an embodiment, the input tool may comprise a relevant button to indicate that the relevant trend, topic, and/or data source information is relevant to the content being reviewed, and a not relevant button to indicate that the relevant trend, topic, and/or data source information is not relevant to the content being reviewed.

In an embodiment, the input and/or activity may comprise a selection of the relevant button or the not relevant button, and the data sourcing and data streaming engine, the trend detection and monitoring engine, and/or the trend recommendation and visualization engine may use the selection to process the subsequent content data.

In an embodiment, the relevance score and the relevant trend, topic, and/or data source information displayed by the suggested trend/topic display may correspond to a first trend/topic, and the visualization display may be configured to display the first trend/topic in the visualization along with a plurality of trends/topics, each associated with a different trend, topic, and/or data source information. Each different trend, topic, and/or data source information may be associated with the content being reviewed. The visualization display may be configured to receive a selection of a second trend/topic of the plurality of trends/topics. The suggested trend/topic display may be configured to respond to the selection by replacing the display of the first trend/topic with a display of a relevance score and relevant trend, topic, and/or data source information of the second trend/topic.

In an embodiment, the visualization display may comprise a geospatial global heatmap of trends and topics by location, network based relational databases and knowledge graphs, and/or time series, temporal, hierarchical, and multidimensional based visualization frameworks.

In an embodiment, the input and/or activity may comprise a decision to approve or reject content being reviewed, and the system may transmit a decision communication to publish the content being reviewed when the decision is to approve, and a decision communication to withhold the content being reviewed when the decision is to reject.

In an embodiment, the system may be configured to control administrative rights of users. When the user is a subject matter expert, the system may be configured to receive from the subject matter expert editing input as part of the input and/or activity, and to use the editing input to edit information in the data sourcing and data streaming engine, the trend detection and monitoring engine, and/or the trend recommendation and visualization engine. When the user is a reviewer, the system may be configured to restrict the reviewer from providing editing input.

In an embodiment, the system may be configured to restrict the reviewer to providing only relevancy input.

In another aspect, the disclosure provides a content management method that may include aggregating content data from data sources; matching data sources with content management metadata and providing relevance scoring of the content data; presenting, through a graphical user interface, an output comprising a relevance score and relevant trend, topic, and/or data source information; receiving from a user through the graphical user interface input and/or activity; and using the input and/or activity for processing subsequent content data.

In an embodiment, presenting the output may comprise simultaneously displaying through the graphical user interface a content management display in which information about content being reviewed is displayed, a suggested trend/topic display, and a visualization display. The suggested trend/topic display may be configured to display the relevance score and the relevant trend, topic, and/or data source information, and to provide an input tool for receiving the input and/or activity from the user. The relevance score and the relevant trend, topic, and/or data source information may be associated with the content being reviewed. The visualization display may be configured to display a visualization of the relevance score and the relevant trend, topic, and/or data source information associated with the content being reviewed.

In an embodiment, the information about content being reviewed may include metadata of the content being reviewed.

In an embodiment, the input tool may comprise a relevant button to indicate that the relevant trend, topic, and/or data source information is relevant to the content being reviewed, and a not relevant button to indicate that the relevant trend, topic, and/or data source information is not relevant to the content being reviewed.

In an embodiment, the input and/or activity may comprise a selection of the relevant button or the not relevant button.

In an embodiment, the relevance score and the relevant trend, topic, and/or data source information displayed by the suggested trend/topic display may correspond to a first trend/topic. The visualization display may be configured to display the first trend/topic in the visualization along with a plurality of trends/topics, each associated with a different trend, topic, and/or data source information. Each different trend, topic, and/or data source information may be associated with the content being reviewed. The visualization display may be configured to receive a selection of a second trend/topic of the plurality of trends/topics. The suggested trend/topic display may be configured to respond to the selection by replacing the display of the first trend/topic with a display of a relevance score and relevant trend, topic, and/or data source information of the second trend/topic.

In an embodiment, the visualization display may comprise a geospatial global heatmap of trends and topics by location, network based relational databases and knowledge graphs, and/or time series, temporal, hierarchical, and multidimensional based visualization frameworks.

In an embodiment, the input and/or activity may comprise a decision to approve or reject content being reviewed, and the method may further comprise transmitting a decision communication to publish the content being reviewed when the decision is to approve, and transmitting a decision communication to withhold the content being reviewed when the decision is to reject.

In an embodiment, the user may be a subject matter expert, and the method may further comprise controlling administrative rights between the subject matter expert and a second user that is a reviewer by receiving from the subject matter expert editing input as part of the input and/or activity, and using the editing input to edit information related to data sourcing and data streaming, trend detection and monitoring, and/or trend recommendation and visualization; and by receiving from the reviewer relevancy input as part of the input and/or activity, and restricting the reviewer from providing editing input.

In an embodiment, the method may further comprise restricting the reviewer to providing only the relevancy input.

In another aspect, the disclosure provides a system for real-time trend/topic detection, monitoring, and recommendations, which may include a content management and processing engine and one or more application engines. The content management and processing engine may be configured to collect and store descriptive data related to content management activities. The one or more application engines may be configured to access through a real-time continuous reporting network content management metadata associated with the collected and stored descriptive data related to content management activities. Based on the content management metadata, the one or more application engines may be configured to perform data streamlining and relevance scoring, provide a user with trend/topic advice for content management processes, and provide the user with trend, topic, and/or data source recommendations. The content management and processing engine may be configured to receive input and/or activity from the user, and to update the collected and stored descriptive data related to content management activities with the input and/or activity.

In an embodiment, the user may be a reviewer, the one or more application engines may be accessible to a subject matter expert user through a real-time continuous interaction network, and the one or more application engines may be configured to receive from the subject matter expert user editing information and to use the editing information to modify at least one of the performing of the data streamlining and relevance scoring, the providing of the trend/topic advice for content management processes, or the providing of the trend, topic, and/or data source recommendations.

In yet another aspect, the disclosure provides a non-transitory computer-readable medium storing software that may comprise instructions executable by one or more computers which, upon such execution, cause the one or more computers to: aggregate content data from data sources; match data sources with content management metadata and provide relevance scoring of the content data; present, through a graphical user interface, an output comprising a relevance score and relevant trend, topic, and/or data source information; receive from a user through the graphical user interface input and/or activity; and use the input and/or activity for processing subsequent content data.

In embodiments, a data sourcing and data streaming engine may serve as a repository of data sources, which may be identified via relevance scoring and distributed to reviewers in response to their content management activities. The selection and prioritization of data sources may be based on a determined relevance of each data source with the content management metadata. For example, content management metadata (e.g., keywords) may be mapped to a respective data source identified in the data sourcing and data streaming engine, a trend detection and monitoring engine may assess trends in the metadata, and a trend recommendation and visualization engine may summarize the metadata as a final relational output connecting the content management metadata with relevant trend, topic, and data source(s). As an example, a content management metadata containing visual and text information on drone-related conflict between Iran and US might have a high relevance score to data sources, trends, and topics containing keywords "drone," "shooting down," and "Iran," and have a low relevance score to data sources, trends, and topics containing keywords "Florida man," "alligator," and "attack." Based on these individual relevance scores, the relevance of a data source to an ongoing content management activity can be determined by combining the relevance scores of the data sources to the keywords identified in the content management metadata. Thereafter, a data source whose combined relevance score to the content management activity is higher than a threshold score may be processed in data source recommendation module of the trend recommendation and visualization engine. The combined relevance score of data source may be determined dynamically and multi-dimensionally, for example, an initial relevance score may be generated by executing keyword processing, followed by generating topic modeling on the processed data source. The relevance scores of data sources may be iteratively streamlined on a continuous basis as data source base undergoes near real-time updates every hour.

In embodiments, a trend recommendation and visualization engine may present a reviewer with an output by making use of the relevance scoring process, which contains a mapped relational recommendation of trend/topic and data source that are relevant for handling ongoing content management activity.

In embodiments, relevance scores may be determined for news, events, and other third-party data sources, with each relevance score representing a measure of relevance of its respective information to the putative occurrence of one or more keywords. The relevance scores of data sources may be generated by processing the contextual information of the given source and searching for the set of predefined trigger keywords within the source. The relevance scores may be iteratively updated on a continuous basis. Determining the relevance score may use a pointwise lexicon-based classification approach, a Semantic Category Score (SCS), a Likelihood Semantic Score (LSS), and/or Category Affinity score.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 4B is a table illustrating exemplary fields presented in a trend/topic advisor, according to an embodiment;

FIG. 6B is schematic diagram of an embodiment of a graphical user interface for a trend administration function in an SME operations real-time trend/topic advisory application engine;

FIG. 6C is a schematic diagram of an embodiment of a graphical user interface for a trend administration function interface in an SME operations real-time trend/topic advisory application engine;

FIG. 7B is a schematic diagram of an embodiment of a graphical user interface for a topic administration function in an SME operations real-time trend/topic advisory application engine; and FIG. 7C is a schematic diagram of an embodiment of another graphical user interface for a topic administration function in an SME operations real-time trend/topic advisory application engine.

DESCRIPTION OF EMBODIMENTS

Figure 1:
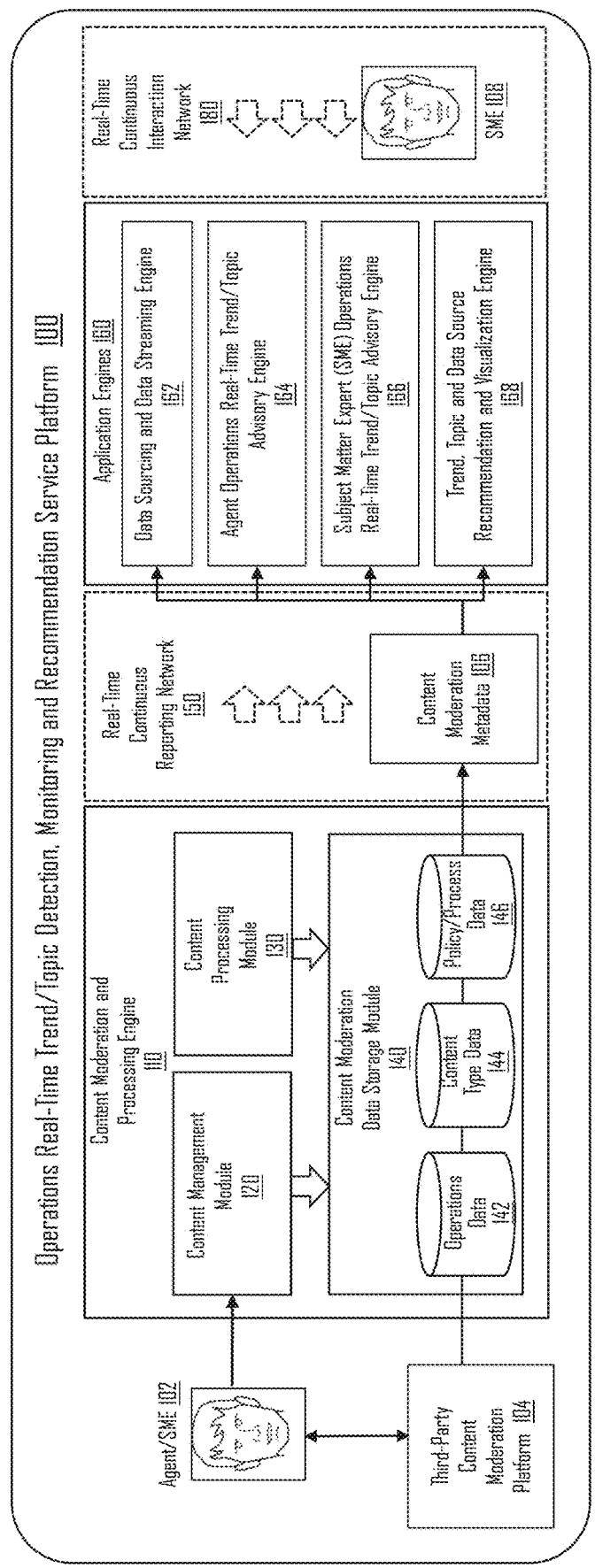
FIG. 1 is a schematic diagram of an embodiment of a content management and operation real-time trend/topic detection, monitoring, and recommendation service platform with integrated application engines.

Systems and methods for content management are disclosed. Embodiments provide systems and methods for improving content management performance, by presenting content reviewers with information, trends, news articles, events, and information signals, which may be useful in handling content monitoring and decisioning in their assigned content backlogs, and in facilitating more efficient content management processes. Based on improved trend, topic, and data source recommendations, the present embodiments may provide more efficient and accurate systems and methods for preventing objectionable content from being published or distributed.

In an embodiment, one component, in general, relates to techniques for handling content, based on the real-time signals impacting content decisioning and review. For example, a keyword triggering process of a content management center may be used to identify and predict trends causing a surge in content volume. The keyword triggering engine may identify, from the pool of aggregate signal data, putative occurrences of one or more keywords of a predefined set of keywords and topics. The dictionary of specific keyword sets may be prepared from a set of knowledge articles, news, and event-related data, and may be stored in a central operational data store. The keyword set selection may be performed based at least in part on their relevance to the topic or content type, and/or putative occurrences of one or more keywords, and also based in part on data stored in association with the content management metadata. During a content management process, visual representations of selected news, events, and other data sources may be presented on a display dashboard associated with the content management center and content reviewer.

Embodiments may include one or more of the following components: keyword triggering engine, keyword cloud visualization, keyword heatmap display, and keyword alerts system, among others. In some embodiments, the keyword triggering engine may be customized to process third-party signal data to identify time zone and locations at which a signal instance of a keyword from a predefined set has been produced.

Relevance scores may be assigned to news, events, and other third-party data sources, with each relevance score representing a measure of relevance of its respective information to the putative occurrence of one or more keywords. The relevance scores of data sources may be generated by processing the contextual information of the given source and searching for the set of predefined trigger keywords within the source. The relevance scores may be iteratively updated on a continuous basis.

The keywords stored in association with content type and/or content management metadata can include, for instance, data describing victimization, elicit reaction, trolling, harassment, and other forms of cyberbullying.

In relation to the set of such keywords, a set of selected data sources may be displayed according to their relevance scores. The set of selected data sources, with their corresponding relevance scores, may be compared and prioritized by their importance. Subsequently, a visualization of the identified data sources may be generated for presentation to the content reviewer. In further embodiments, the prioritization of data sources by their relevance scores may be performed according to time zone intervals and locations.

Examples of the predefined set of data sources may include content associated with news, social media posts, events, and other trends. In further embodiments, content reviewer may be configured to input data sources displayed in a recommendation dashboard as relevant according to their decisioning and policy awareness. The results with user inputs may be reassessed and analyzed and displayed in a final data source recommendation view.

In an embodiment, another component, in general, relates to methods for allowing content reviewers or supervisors to review and communicate past, ongoing, and future content management event updates related to content management policy and process updates. For example, when a keyword triggering engine presents an agent (e.g., content reviewer, supervisor, or subject matter expert) with abuse-related keywords from a predefined set of keywords, used to process an image, video, or other social media content, a reviewer can input additional policy and process updates into the engine, which in turn helps the engine to become smarter and learn from ongoing human inputs. A content-specific visual representation of the relevant keywords and data sources may be displayed in a reviewer dashboard.

The techniques described in this document can be applied to many different types of operation centers, such as call centers, contact centers, content management centers, order processing centers, and many other associated business units. The functions described in this document can be applied in these business units to benefit operation center performance and cost optimization. For example, such techniques can help content management centers increase reviewer efficiency and performance, reduce average handling time, improve policy and process compliance, and reduce operation cost spending. The techniques may also help increase supervisor effectiveness and performance of quality review and subject matter expert personnel. Thus, by providing operation centers with improved real-time trend/topic detection, monitoring, and recommendation services, operation centers and other associated business units can improve their average handling time, quality assurance, and volume in order to create stronger relationship with clients.

In applying the present embodiments to operation centers, the present embodiments implement technical and functional improvements to previous manual approaches to content management. Those manual approaches have typically relied on three stages, including monitoring, tracking, and communication. In the monitoring stage, content management teams manually (e.g., by online searches by individual human reviewers) follow and search events at a set periodic basis and check for relevant news updates. The teams search for news and trends using keywords/phrases that are known to be associated with potential violations of content management policies, such as hate language, violence, and nudity. Teams also make note of trends and topics that are seen in content management queues. Teams huddle for weekly in-person meetings to discuss events and trends seen in the news and content management queues. Teams are assigned to identify and monitor planned and unplanned events and trends, and to identify and monitor trends within content management queues.

The above monitoring steps rely on human observations, which can be inaccurate (e.g., a human may inadvertently overlook text/images and/or may have flawed perception of trends) and biased. These inaccuracies and biases trickle down to the subsequent stages of manual content management.

In the tracking stage, teams manually aggregate (e.g., by spreadsheets or database populated by human reviewers) unplanned and planned events and trends for further validation and prioritization based on the importance and prevalence of identified trends and events. Teams obtain approval to communicate aggregated events and trends for further communication with reviewers.

In the communicating stage, teams alert reviewers about planned, unplanned events, and trends via email communications to help the reviewers gain contextual information on assigned content volume. Teams share reporting on planned and unplanned events during team huddles, client business reviews, leadership checkpoints, and newsletters. Reviewers are notified by a team about events and trends that might impact their content management work types.

Accordingly, at each stage of that manual content management approach, input from human reviewers is required, thereby introducing many opportunities for inefficiencies, inaccuracies, and biases. In addition, the data sources used throughout the monitoring, tracking, and communicating stages are limited by the capacity of human reviewers, as teams must manually source and analyze events, events, trends, topics and news that are relevant to content management activities. As such, human reviewers can feasibly manage only a handful of sources, such as Daily Mail™, CNN™, Fox News™, Al-Jazeera™, and New York Times™.

Against that backdrop of inefficiencies, the present embodiments provide considerable functional and technical improvements over the manual content management techniques, as well as entirely new data associations and technical computing efficiencies that were never before possible. For example, the present embodiments may integrate multi-modality data sourcing techniques, according to which more than 10,000 public data sources—spanning social media, web forums, blogs, local media, the deep/dark web, and public sensor data—are fed into the trend detection and monitoring engine. Humans are not capable of accurately processing information from this many sources.

The present embodiments may also process and cross-correlate an expanding variety of data types and formats, including text in multiple languages, images, video, sound, and streaming machine data from sensors. Humans are not capable of accurately processing information from all of these data types and formats, and accordingly cannot possibly identify correlations in the data.

The present embodiments may also instantaneously process and ingest real-time social media data feeds along with the text of the public social media post, and other varieties of public data fields attached to each post, totaling billions of real-time signals a day. Humans are not capable of accurately processing this much information, let alone processing it in real time.

The present embodiments may also process these data feeds through a broad spectrum of artificial intelligence (AI) models on a real-time basis, to score, rank, filter, classify, cluster, identify, classify, and summarize data feeds from numerous data sources. These AI models may span supervised, semi-supervised, and unsupervised learning. The models may extensively use neural networks, ranging from convolutional neural networks to recurrent neural networks, including long short-term memory networks. Humans again cannot process such volumes of information and, more importantly, cannot prioritize the data, so that the most relevant data is presented first.

Using feedback loops, the present embodiments may also improve the functioning of a computer by decreasing the amount of computing capacity and network bandwidth required to process the information, by, for example, enabling the identification of relevant information more quickly, with fewer iterations and fewer queries to a central processing unit. For example, embodiments may aggregate and process historical patterns in data feeds, user input (e.g., regarding relevancy), and user activity, which may be later used to train new artificial intelligence models for more effective detection of real-time events in the present time. In addition, embodiments may leverage data feeds to iteratively train and optimize the performance of numerous real-time event detection algorithms, ranging from multi-variable real-time online learning models that predict correlation of the data feed to content management queues, relevancy, virality, and velocity of becoming a trend that can later impact content management queues.

The above functional and technical improvements enable a much wider universe of data sources, including, for example, events and news signals, location-related signals, demography-related signals, social media reporting, crime reporting signals, and weather reporting signals. The source and information types for events and news signals may include, for example, politics and government, economics and finance, culture and entertainment, disaster, emergency, technology, sports, airport delays, school holidays, public holidays, observances, politics, conferences, expos, concerts, festivals, performing arts, sports, community, daylight savings, airport delays, severe weather, and other news. The source and information types for social media reporting may include, for example, Twitter™, Facebook™, and WhatsApp™.

Generally, embodiments of the content management systems and methods disclosed herein include provisions for trend/topic detection, monitoring, and advising. FIGS. 1-7C illustrate an example of such systems and methods, as described in detail below.

1. Integrated Operations Real-Time Trend/Topic Detection, Monitoring and Recommendation Analytics Platform.

Referring to FIG. 1, one embodiment of an operation center service platform 100 may be intended for providing an integrated operations trend and topic detection, monitoring, and recommendation analytics service via real-time continuous reporting 150. In this embodiment, operation center service platform 100 may implement at least two types of service engines along with four application engines 160. A content management and processing engine 110 may be configured to streamline reviewer and SME operations 102 and reviewer/SME interaction with third-party content management platform 104, to extract useful data from ongoing interactions with content. Based on content management metadata 106, a data derived from content management data storage module 140, a set of application engines 160 may be configured for performing data streamlining and relevance scoring 162, user operations trend and topic advisory for content management processes 164 and 166, and finally, trend, topic, and data source recommendations 168, to help improve reviewer and subject matter expert (SME) content review.

In embodiments, upon receiving assigned content for review, a reviewer/SME 102 may initiate a loop of interactions between the third-party content management platform 104 and the content management and processing engine 110, which may contain content management module 120, content processing module 130, and content management data storage module 140. Some implementations of data storage module 140 may be further configured to process operations data 142, content type data 144 (e.g., image, video, share and text), and policy and process updates data 146. Once content review is initiated, content management metadata 106 may be established to convert content-related data streams from a content management environment to application engines 160. Thus, the content management and processing engine 110 may be configured to collect and store descriptive data related to content management activities. Examples of such data include: content type such as image, video, share, or text; content decision types such as skip, delete, and escalate; content handling time, review consistency, and error rate; and content-related policy and process updates; all of which can be saved as metadata 106 for real-time continuous reporting to application engines 160. In other embodiments, content data stored in metadata can be also cross-linked to reviewer identifiers, reviewer sites, and other reviewer-related information.

Data in the content management metadata 106 can be accessed by the application engines 160 over real-time continuous reporting network 150. Depending on the service setup, the application engines 160 may include a set of other advanced machine-learning and statistical functional engines, each developed to perform analytic tasks on processed content. Examples of the application engines 160 that are described in further detail below include: data sourcing and data streaming engine 162; reviewer operations real-time trend and topic advisory engine 164; SME operations real-time trend and topic advisory engine 166; and trend, topic, and data source recommendation and visualization engine 168. The operation center SMEs can interact with some of the application engines 160 via interaction network 180, to administer trend, topic, and data source recommendations and also help the machine-learning engines become smarter by learning from the continuous human inputs.

In some embodiments, the content management and processing engine 110 may also be used to streamline real-time data via reporting network 150, coupling the two types of service engines 110 and 160. One type of real-time data may include a stream of video content representative of ongoing live video recording, a feature that is enabled in most social media platforms.

By processing and analyzing ongoing data transmission and associating the transmitted metadata with data sources derived from data streaming engine 162, one or more of the application engines 160 may provide real-time recommendations to help reviewers and SMEs handle content and operation processes on a timely basis, thereby improving content management performance and overall reviewer and SME performance.

2. Application Engines 2.1 Data Sourcing and Data Streaming Engine

Figure 2:
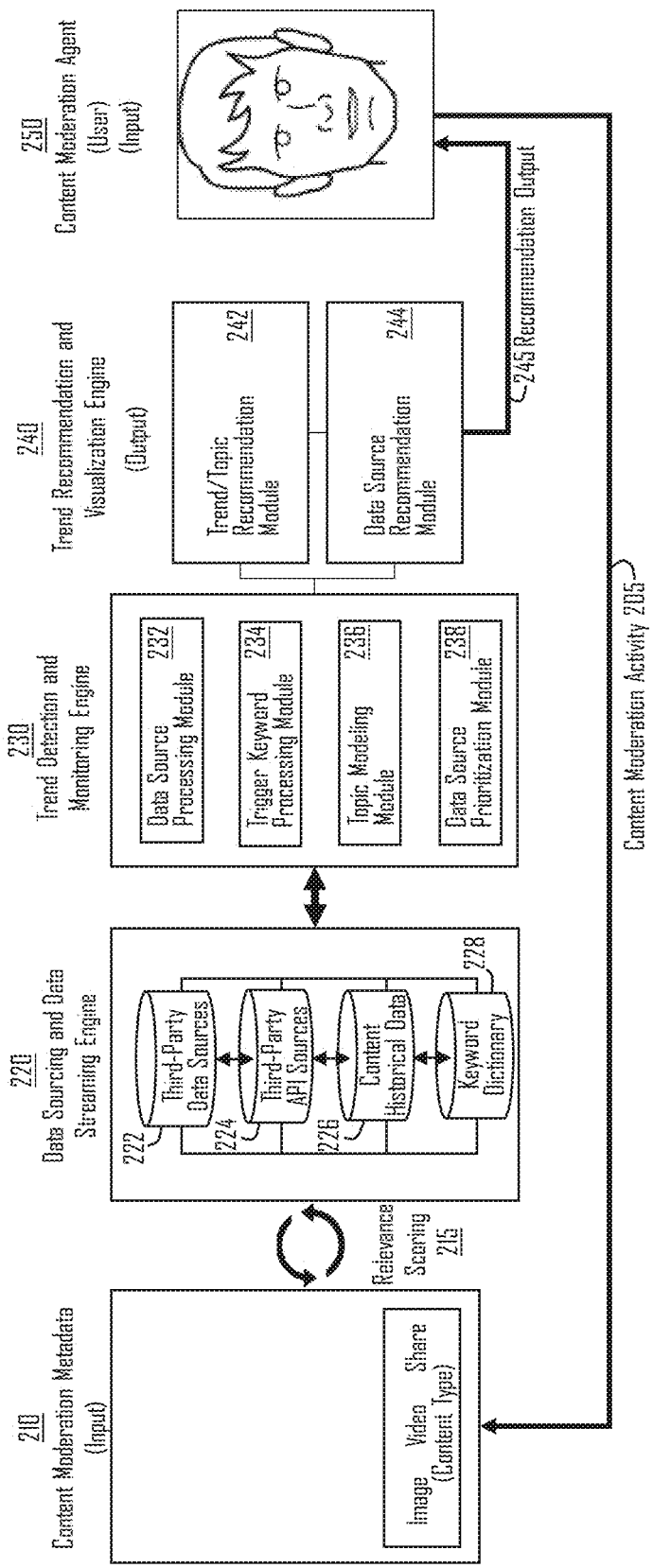
FIG. 2 is a schematic diagram of an embodiment of a reviewer operations real-time trend/topic advisory application engine.

Referring to FIG. 2, in an embodiment, one component of an application engine 160 may be a data sourcing and data streaming engine 220 (or 162 of FIG. 1), which may be configured for aggregating historical, ongoing, and scheduled signals from different third-party data sources (such as event APIs, social media APIs, and search analytics APIs). Examples of data sources include third-party data sources 222, third-party API sources 224, historical data related to content management 226, and a keyword dictionary 228 containing trigger and alert words and phrases, which are composed based on policy and process updates by SMEs. The data streaming engine 220 may be a foundational layer for providing reviewers with real-time recommended trends, topics, and data sources relevant to their ongoing content management activities 205. The process of third-party data stream mining 220 and real-time relevance scoring 215 used for matching data sources 222-228 with content management metadata 210 may be accomplished with trend detection and monitoring engine 230. Example modules of trend detection and monitoring engine 230 include: data source processing module 232 used for data source relevance scoring 215; trigger keyword processing module 234 used for spotting within data sources trigger keywords from the keyword dictionary 228; topic modeling module 236 used for recommending relevant topics; and data source prioritization module 238 paired with trend and topic recommendations. The third-party data source 220 and metadata 210 relevance scoring 215 may be based on the retrieval and matching of keywords by their frequencies and volumes in both databases (210 and 220). The relevance scoring 215 may be based on real-time signal processing from aggregated historical, ongoing, and scheduled events and news, such as holidays, concerts, conferences, sports, airport delays, severe weather warnings, disasters, terror announcements, and others, from various data streams and identifying the most relevant types of events in real-time that are deemed useful for content management activities 205. Thus, data sourcing and data streaming engine 220 may perform the following functions:

Aggregation of historical, ongoing, and scheduled signals from different third-party data sources (such as event APIs, social media APIs, and search analytics APIs);

Prioritization and scoring of real-time signal feeds by high-frequency, high-volume, high-relevance, and exponential decay scoring of the signal; and/or Real-time reporting and streaming of data sources relevant to trend detection and monitoring engine by filters such as time period, frequency, volume, relevance, and signal decay patterns.

The relevance scoring of data sources may involve aggregation, storing, and processing of signal data from various data sources over a certain period of time. Metrics, such as high-frequency, high-volume, high-relevance, and exponential decay scoring of the signal, may be used to accurately measure impact of the event, news, and social media signals on the content management activities. The quantification of these may be measured by a fixed time period-based scoring method and an exponential decay scoring algorithmic approach. The exponential decay scoring method may be based on the assumption that impact of an event, news, and social media signal continually decays over time and therefore, is different from a simple fixed time period-based scoring method. The exponential decay tracking approach can be also implemented using a few entries of signal data, as opposed to requiring all-time aggregate data needed for a fixed time period approach.

2.2 Reviewer Operations Real-Time Trend/Topic Advisory Engine 2.2.1 Content Reviewer Referring again to FIG. 2, in an embodiment, one component of an application engine 160 may be a reviewer operations real-time trend and topic advisory engine 200 (or 164 of FIG. 1), which is configured for providing reviewers with real-time trend and topic recommendations along with originating data sources to assist them in their content management activities 205.

As shown in FIG. 2, one embodiment of a reviewer operations trend and topic advisory engine 200 may include at least three engines: data sourcing and data streaming engine 220; trend detection and monitoring engine 230; and trend recommendation and visualization engine 240. In embodiments, trend detection and monitoring engine 230 may include data source processing module 232, trigger keyword processing module 234, topic modeling module 236, and data source prioritization module 238. The data source processing module 232 may provide a process by which data from data streaming engine 220 is gathered and expressed as a summary for statistical and machine-learning implementations. The data source processing may involve various steps, such as ensuring data sources are correct and relevant, arranging data sources into different sets, summarizing data via keyword tags, combining multiple sources of data by their similarities and relevance, analysis and data interpretation, summary data of computed information, and classification of data sources into various categories. For example, raw data sources can be aggregated as a single source over a given time period and/or as multiple sources gathered spatially over a given time period. Data sources may be collected and reported within the context of various originating locations and time intervals.

A storage of raw data sources and aggregated data may be written to the database once per hour, affording near real-time data source aggregation and processing for timely statistical analysis and insights. The trigger keyword processing module 234 may utilize keyword dictionary 228, which may contain a pre-defined set of trigger keywords and phrases by content management SMEs. The keyword dictionary 228 may be defined in data sourcing and data streaming engine 220 by their semantic meaning and likelihood to appear in the given trigger category, such as hate speech, nudity, pornography, and others.

The trigger keyword processing module 234 may be accomplished with a pointwise lexicon-based classification approach, where a set or categories of trigger keywords and phrases 228 may be used to label and score data sources by their relevance. The keywords per categories may be used to assign approximate labels to the unlabeled data sources by term-tagging. The pointwise lexicon-based approach may label processed data sources 232 with category-specific knowledge in the form of a few trigger keywords per category and a category hierarchy. The approach may combine keyword semantic evaluation and score assignment. Results show that accuracies close to human agreement can be obtained using this approach. The keywords that were found in the given data sources in trigger keyword processing module may then be tagged via data source scraping and assigned a weight per category, which is also known as a Semantic Category Score (SCS). The metric SCS is used to measure a sum of category-specific keywords that have been identified and flagged. The keyword types, such as single word "unigram," two consecutive written units of keywords "bigram," and three consecutive written units of keywords "trigram," may have their own SCS values and may be defined as follows:

$$SCS\ (\text{Unigram}) = \frac{\text{Number of Total Tagged Unigrams}}{\text{Total Scraped Unigrams per Category}} \quad (1)$$

$$SCS\ (\text{Bigram}) = \frac{\text{Number of Total Tagged Bigrams}}{\text{Total Scraped Bigrams per Category}} \quad (2)$$

$$SCS\ (\text{Trigram}) = \frac{\text{Number of Total Tagged Trigrams}}{\text{Total Scraped Trigrams per Category}} \quad (3)$$

These values may be used to measure and determine the likelihood of a data source belonging to a certain category, which is also known as Likelihood Semantic Score "LSS." The metric LSS of category may be defined as follows:

$$LSS\ (\text{Category}) = \quad (4)$$
$$\frac{SCS(\text{Unigram}) \cdot 10 + SCS(\text{Bigram}) \cdot 20 + SCS(\text{Trigram}) \cdot 30}{3}$$

Then, LSS of category becomes the input to a Category Affinity score used for measuring the category hierarchy. Category Affinity is a percent metric of SCS and may be used to prioritize data sources 238 by their ranking within a set of categories.

This classification method can be also used to perform data source annotation such as content classification; entity extraction from the content such as the names of public figures, company names, destinations, and others; sentiment analysis used to identify prevailing emotional opinion within the data source; and entity sentiment analysis, which is used to inspect a given data source for known entities and return output about emotional opinion of those entities within a data source.

In summary, the trigger keyword processing module 234 may accept inputs from data sourcing and data streaming engine 220 and analyze and score data sources using a keyword dictionary 228 with trigger keywords and phrases. The results of trigger keyword processing module may be provided to the data source prioritization module 238, which in turn, may access data source engine 220 to select a candidate set of data sources for recommending to the reviewer 250 in trend recommendation and visualization engine 240.

Furthermore, one embodiment of a reviewer operations trend and topic advisory engine 200 includes a topic modeling module 236, which may be configured as a classifier tool to spot trending topics within aggregated data sources 220. The topic modeling module 236 may be a machine-learning and natural-language processing classification tool that is used for identifying distinct semantic structures and categories occurring within data sources. As the name suggests, topic modeling module 236 may provide a process for automatically identifying categories present in a text object and deriving hidden patterns exhibited by a text corpus.

Topic modeling is different from rule-based text mining approaches, which are based on regular expressions or dictionary-based keyword searching techniques, such as the pointwise lexicon-based classifiers described above. Topic modeling may be an unsupervised machine-learning approach used for finding and observing a set of keywords in large clusters of texts. The categories identified in topic modeling can be defined as "a repeating pattern of co-occurring terms in a corpus." For example, the output of a topic modeling for category "Sensitive Subjects" could contain the following set of keywords: "assault," "guns," "violation," "second-degree," "armed," "penalty," and "death."

While there are many approaches to obtaining topics from a text, an exemplary topic modeling technique of the present embodiments may utilize a Latent Dirichlet Allocation (LDA) algorithm that assumes topics are produced from a mixture of data sources. These topics can generate keywords based on their probability distribution and likelihood to belong to a given category. Given a set of data sources, LDA, as a matrix factorization technique, may determine the type of topics to extract from a collection of documents. The extraction of an optimal number of topics can be determined with divergence scoring methods.

Topic modeling may involve document preparation steps such as compiling all documents into one corpus, and cleaning and preprocessing to remove punctuations, special characters, and stop words, to normalize the corpus. Once the corpus is ready, it can then be converted into a document-term matrix representation necessary to run mathematical models. A next step may involve creation of an object for the LDA model and training it on the document-term matrix. The final output of the LDA model may result in a set of topics along with the set of keywords defining each topic. In this context, topic modeling module 236 may be very useful for the purpose of identifying hidden topics that enable relevant data source retrieval from unstructured text and latent features 220, and data source selection and prioritization 238 by their semantic and contextual data.

A data sourcing and data streaming engine 220 may serve as a repository of data sources, which may be identified via relevance scoring 215 and distributed to reviewers 250 in response to their content management activities 205. The selection and prioritization of data sources 238 may be based on a determined relevance of each data source with the content management metadata 210. For example, content management metadata, such as "Iran," "conflict," "drone," "US," and "attack," may be mapped to a respective data source identified in data sourcing and data streaming engine 220, assessed for trends via trend detection and monitoring engine 230, and summarized as a final relational output connecting content management metadata with relevant trend, topic, and data source via trend recommendation and visualization engine 240. A content management metadata containing visual and text information on drone-related conflict between Iran and US might have a high relevance score to data sources, trends, and topics containing keywords "drone," "shooting down," and "Iran," and have a low relevance score to data sources, trends, and topics containing keywords "Florida man," "alligator," and "attack." Based on these individual relevance scores, the relevance of a data source to an ongoing content management activity 205 can be determined by combining the relevance scores of the data sources to the keywords identified in the content management metadata. Thereafter, a data source whose combined relevance score to the content management activity 205 is higher than a threshold score may be processed in data source recommendation module 244 of trend recommendation and visualization engine 240. The combined relevance score of data source may be determined dynamically and multi-dimensionally, where the relevance scores from keyword processing module 234 and topic modeling module 236 are combined and processed together. For example, an initial relevance score may be generated by executing keyword processing module 234, followed by generating topic modeling module 236 on the processed data source. The relevance scores of data sources may be iteratively streamlined on a continuous basis as data source base 220 undergoes near real-time updates every hour.

In embodiments, trend recommendation and visualization engine 240 may present a reviewer 250 with an output 245 by making use of the relevance scoring process 215, which contains a mapped relational recommendation of trend/topic 242 and data source 244 that are relevant for handling ongoing content management activity 205. For example, while reviewing a content in the form of an image with metadata 210 such as "accident," "car," "underage," and "drinking," a reviewer 250 may be presented with relevant trend, topic, and data source information from trend/topic recommendation module 242 and data source recommendation module 244. Using such content management-specific information, such as relevant trends, topics, and data sources, real-time recommendation can be performed, thereby advising a reviewer of trends, topics, and verified data sources that were unavailable to the reviewer in conventional content management processes, and thereby making the reviewer more efficient and effective.

The trend recommendation and visualization engine 240 may form a visual representation of the identified trend, topics, and data source via recommendation output unit 245 (for example, on a reviewer's dashboard). The trend, topics, and data sources can be presented in different ways, using various front-end and back-end interface development frameworks, to provide real-time recommendations to reviewers.

Figure 3:
FIG. 3 is a schematic diagram of an embodiment of a graphical user interface of a trend advisory application engine, presented to a reviewer during content management activity.
Figure 4A:
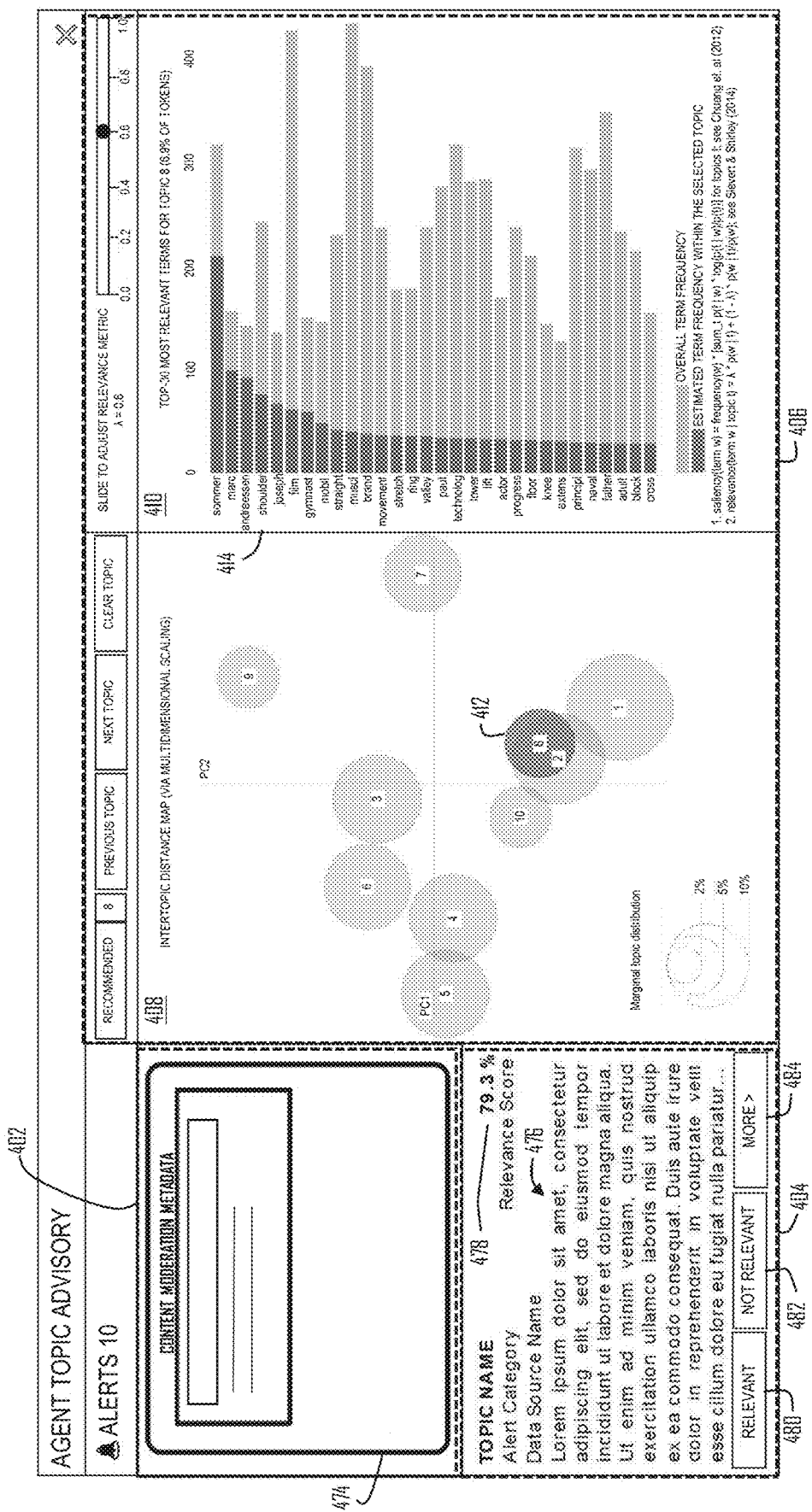
FIG. 4A is a schematic diagram of an embodiment of a graphical user interface of a topic advisory application engine, presented to a reviewer during content management activity.

FIGS. 3 and 4A illustrate examples of graphical user interfaces of trend and topic advisory, along with data sources related to the content that is being reviewed. As shown, each display may include: trend and topic name; alert category such as "Hate Speech," "Nudity," and "Abuse"; data source reference; and relevance scores. The reviewer can confirm, disregard, or investigate further the recommended trend and topic by selecting the respective options "Relevant," "Not Relevant," or "More." Once one of the options is selected, a reviewer may be presented with a full view of the recommendation.

As the business and operation requirements change, the application interface can be modified to suit the needs of content management teams. For example, the recommendation display view of relevant trends and topics can be presented using different types of visualization techniques such as geospatial global heatmap of trends and topics by location, network based relational databases and knowledge graphs, and time series, temporal, hierarchical, and multi-dimensional based visualization frameworks.

Referring to FIGS. 1-4B, embodiments may provide data process flows for advising human content reviewers on trends, topics, and data sources in real-time, while the human reviewers are performing content management activities. Embodiments may advise a content reviewer through reviewer trend recommendation interfaces and reviewer topic recommendation interfaces, embodiments of which are outlined below.

Reviewer Trend Recommendation Interface:

1. A user may interact with an interface, such as the example interface 370 illustrated in FIG. 3, during a content management process.

2. A user may be presented with trend and data source recommendation features 372 overlaid on top, or displayed alongside, of the content management metadata 374 such as a current ongoing queue under user's content management review.

3. Along with the trend and data source recommendations, a user may be presented with a description 376 of the trend and a relevance score 378 that is measured using a pointwise lexicon-based classification approach.

4. As shown, a user may also be presented with candidate alert and alert categories that are relevant to the ongoing content management activity.

5. A user may be presented with example input features such as a "Relevant" button 380 and a "Not Relevant" button 382 to help the user categorize trend recommendations and provide relevancy feedback, and a "More" button 384 to access and view more trend recommendations.

6. As shown on the right side of FIG. 3, after a user selects the "More" option, interface 370 may present to the user all possible trend recommendations (in this example, three), with trend recommendations that are also listed under alerts notification.

Reviewer Topic Recommendation Interface:

1. A user may interact with a reviewer topic recommendation interface, such as the example interface 400 illustrated in FIG. 4A, during a content management process.

2. A user may be presented with topic and data source recommendation features 404 overlaid on top, or displayed alongside, of the content management metadata 474 such as a current ongoing queue under user's content management review.

3. Along with the topic and data source recommendations, a user may be presented with a description 476 of the topic and a relevance score 478 that is measured using a topic modeling machine-learning classification approach.

4. Interface 400 may also present a user with a topic modeling recommendation interface 406 along with top keywords that best describe a recommended topic.

5. As shown, user may also be presented with candidate alert and alert categories that are relevant to the ongoing content management activity.

6. A user may be presented with example input features such as a "Relevant" button 480 and a "Not Relevant" button 482 to help the user categorize trend recommendations and provide relevancy feedback, and a "More" button 484 to access and view more topic recommendations.

7. A user may be presented with the next most relevant topic recommendation after a user selects the "More" button 484.

Referring to FIG. 4A, in an embodiment of a reviewer topic recommendation interface 400 (which may also be referred to as a reviewer topic advisory interface), a reviewer may be presented with topic suggestions alongside, or as an overlay on top, of content that is currently under review. As shown, reviewer topic recommendation interface 400 may include a content management display 402, a suggested topic display 404, and a topic visualization display 406.

Content management display 402 may display the current content that the human content reviewer is evaluating. The current content may include text and images, for example, as may be seen in a social media post, such as a Facebook™ post with comments, photos, and/or video.

Suggested topic display 404 may display a suggested topic related to the current content displayed in content management display 402. Referring to FIG. 2, the content of suggested topic display 404 may be the recommendation output 245 from the trend recommendation and visualization engine 240. The suggested topic may include information such as a topic name, an alert category, a data source name, a description of the topic, and a relevance score. The suggested topic display 404 may also provide feedback tools that allow a content reviewer to indicate the relevancy of the suggested trend/topic. The feedback tools may include, for example, a "relevant" button 480 to indicate that suggested topic is relevant to the current content, a "not relevant" button 482 to indicate that the suggested topic is not relevant to the current content, and a "more" button 484 to access more topic recommendations, or to access additional options for indicating the relevancy, such as more granular ratings or narrative input describing the degree of relevancy.

Topic visualization display 406 may provide visualization tools for assessing the relevancy of a suggested topic. Referring to FIG. 2, the content of topic visualization display 406 may be the recommendation output 245 from the trend recommendation and visualization engine 240. As shown in FIG. 4A, in one embodiment, topic visualization display 406 may include an intertopic distance map 408 and a bar chart 410.

Intertopic distance map 408 and bar chart 410 may use multidimensional scaling to graphically illustrate the relevancy of a topic. For example, a size of the icon (e.g., a larger circle or longer bar indicating higher relevancy), a numeral ranking (e.g., lower number indicating higher relevancy), or a plot position (e.g., the proximity of icons indicating relationships between topics) may be used to indicate relevancy, as well as relevancy relative to other topics. In embodiments, topic visualization display 406 may be an interactive tool based on Latent Dirichlet Allocation (LDA) topic modeling, described above. The interactive topic visualization display 406 may provide a global view of the topics (and how they differ from each other), while also permitting a user to more closely examine the terms most associated with each individual topic. In one implementation, the interactive topic visualization display 406 may be an LDAvis interactive visualization system, as explained by Carson Sievert and Kenneth E. Shirley in the article, "LDAvis: A method for visualizing and interpreting topics," *Proceedings of the Workshop on Interactive Language Learning, Visualization, and Interfaces*, pages 63-70, Baltimore, Md., USA, Jun. 27, 2014, which is herein incorporated by reference.

The intertopic distance map 408 visualizes the topics as circles in a two-dimensional plane. A center of a circle is determined by computing the Jensen-Shannon divergence between topics, and then by using multidimensional scaling to project the intertopic distances onto two dimensions. Each topic's overall prevalence is encoded using the areas of the circles.

The bar chart 410 may be a horizontal bar chart, with the bars representing the individual terms that are the most useful for interpreting the currently selected topic on the intertopic distance map 408 (e.g., the selected topic in FIG. 4A is the circle shaded differently than the remaining circles). In the bar chart 410, a pair of overlaid bars may represent both the corpus-wide frequency of a given term as well as the topic-specific frequency of the term.

In embodiments, a human content reviewer may interact with topic visualization display 406 in a number of ways, to evaluate and understand the suggested topics. For example, selecting in the intertopic distance map 408 the circle 412, which is designated to represent topic 8 (or the eighth highest ranked topic), may cause the bar chart 410 to display the thirty most relevant terms for topic 8, as shown in FIG. 4A.

As another example, a user may select a term (such as term 414 "shoulder" in FIG. 4A) listed in the bar chart 410 by clicking on, or hovering over, the term, which may cause the intertopic distance map 408 to display the conditional topic distribution for that term.

As another example, a user may drag the $\lambda$ slider of the bar chart 410 to rank the terms according to term relevance. By default, the terms of a topic may be ranked in decreasing order according their topic-specific probability ($\lambda=1$). Moving the slider adjusts the rank of the terms based on how much discriminatory (or "relevant") the terms are for the specific topic. A typical suggested "optimal" value of $\lambda$ is 0.6. The relevance may be determined by: relevance(term w|topic t)=$\lambda$*p(w|t)+(1-$\lambda$)*p(w|t)/p(w).

As another example, a user may click on the "next topic" button 416 to move to the next suggested trend/topic in rank order, or may click on the "previous topic" button 418 to move to the previous suggested trend/topic in rank order. In each of those cases, the intertopic distance map 408 and bar chart 410 would change to represent the chosen topic. A user may also click on the "clear topic" button 420 to clear the topic and cause the bar chart 410 to display the most salient terms, determined, for example, by: saliency(term w)=frequency(w)*[sum_t p(t|w)*log(p(t|w)/p(t))] for topics t.

The interactivity may further extend to other portions of the reviewer topic recommendation interface 400. For example, selecting a topic within the topic visualization display 406 may cause the suggested topic display 404 to change and display content related to the selected topic. By selecting and viewing the different suggested topics, a human content reviewer may efficiently and comprehensively understand and evaluate the topics and provide valuable feedback on whether suggested topics are relevant to the content under review in content management display 402. In the manner, the reviewer topic recommendation interface 400 presents new ways of associating content being managed with suggested topics.

As an example of such an evaluation, a human content reviewer may first read a topic suggestion in the topic visualization display 406 to gain more contextual information on the content that is under current review in the content management display 402. The reviewer may then analyze the relevance and applicability of the suggested topic. The reviewer may then indicate whether the suggested topic is relevant or not relevant, by flagging it with a click of a button. That feedback (e.g., as represented by content management activity 205 in FIG. 2) is ingested as a new knowledge for further engine improvements. Based on the information provided by the suggested topics, the reviewer can then make a decision on the current content displayed in the content management display 406, for example, indicating whether to approve or reject the content (e.g., by clicking an "approve" button or a "reject" button on the interface 400 or another interface page). After receiving the decision on the content being managed, reviewer topic recommendation interface 400 may display the next content to review in the content management display 402, along with a corresponding suggested topic in the suggested topic display 404, and a corresponding group of topics in the topic visualization display 406. In addition, in embodiments, instructions corresponding to the decision on the content being managed (e.g., approve or reject) may be communicated so that the content, for example, is allowed to be or remain published or distributed, is withheld from being published or distributed, or is deleted or taken down from publication or distribution. The decision communication may be part of the content management activity 205 managed by the reviewer operations trend and topic advisory engine 200 and may be communicated to an entity controlling the publishing or distribution of the content, e.g., to or through third-party content management platform 104 of FIG. 1.

The above-described evaluation and feedback aspects of the reviewer topic recommendation interface 400 of FIG. 4A also apply to the reviewer trend recommendation interface 370, through which a user may evaluate and provide feedback on trends (rather than topics), using similar displays and input tools, as shown in FIG. 3. In addition, in embodiments, the expanded and interactive topic-related displays of FIG. 4A may also be used for trends. For example, referring to FIG. 4A, the suggested topic display 402 could be a suggested trend display and the topic visualization display 406 could be a trend visualization display or some other expanded display of a pointwise lexicon-based classification approach.

Throughout these interactions, the feedback provided by the human content reviewers may be used by a reviewer operations real-time trend/topic advisory engine to streamline future iterations of determining relevancy and suggesting trends/topics to human content reviewers, for example, as described above in reference to FIG. 2, where content management activity 205 is returned for use in content management metadata 210. As described above, that feedback loop may reduce the computing resources necessary for the data sourcing and data streaming engine 220 and the trend detection and monitoring engine 230 to accomplish their functions, for example, in processing data, identifying trends/topics, and providing recommendations for future iterations of content management.

In embodiments, the reviewer topic recommendation interface 400 can be implemented as a plugin or add-on tool on top of existing content management tools. In an embodiment, the reviewer topic recommendation interface 400 may present many different data fields, examples of which are shown in the chart of FIG. 4B.

2.2.2 Subject Matter Expert

Figure 5:
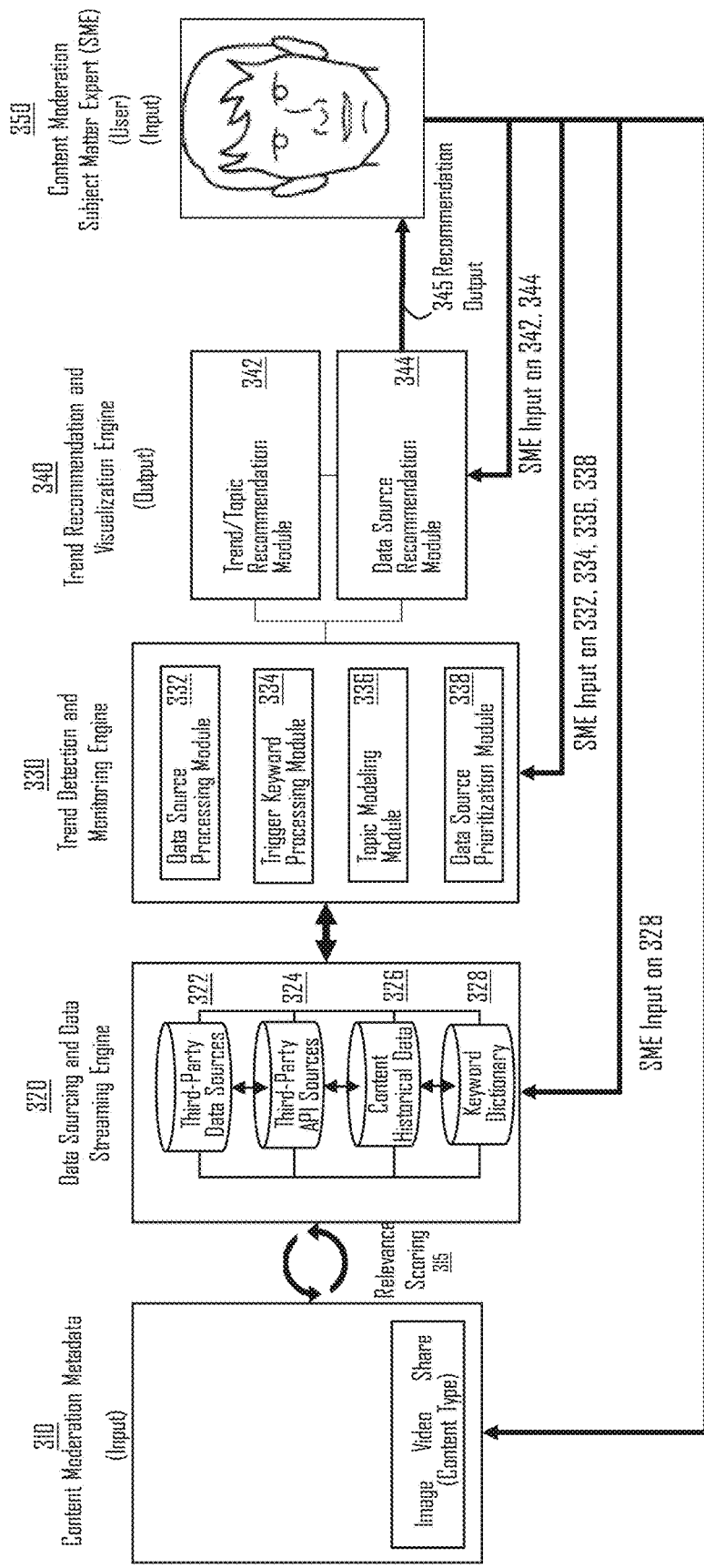
FIG. 5 is a schematic diagram of an embodiment of a subject matter expert (SME) operations real-time trend/topic advisory application engine.

FIG. 5 illustrates an embodiment of a subject matter expert (SME) operations real-time trends and topics advisory engine 300, which may contain application functions and features of the reviewer operations trend and topic advisory engine 200 illustrated in FIG. 2. The advisory engine 300 may also contain at least three engines carrying the same functionalities as engine 200: data sourcing and data streaming engine 320; trend detection and monitoring engine 330; and trend recommendation and visualization engine 340. The function and features of the engine 300 that may differ from those found in the engine 200 may concern administrative rights designed for a supervisory role such as a subject matter expert (SME). In embodiments, the SME trend and topic advisory engine 300 may allow an SME (e.g., a supervisor) to enter their inputs into: data sourcing and data streaming engine 320 to modify and update keyword dictionary 328; trend detection and monitoring engine 330 to re-group and re-prioritize data sources; and recommendation and visualization engine 340 to re-arrange trends, topics, and data sources.

Figure 6A:
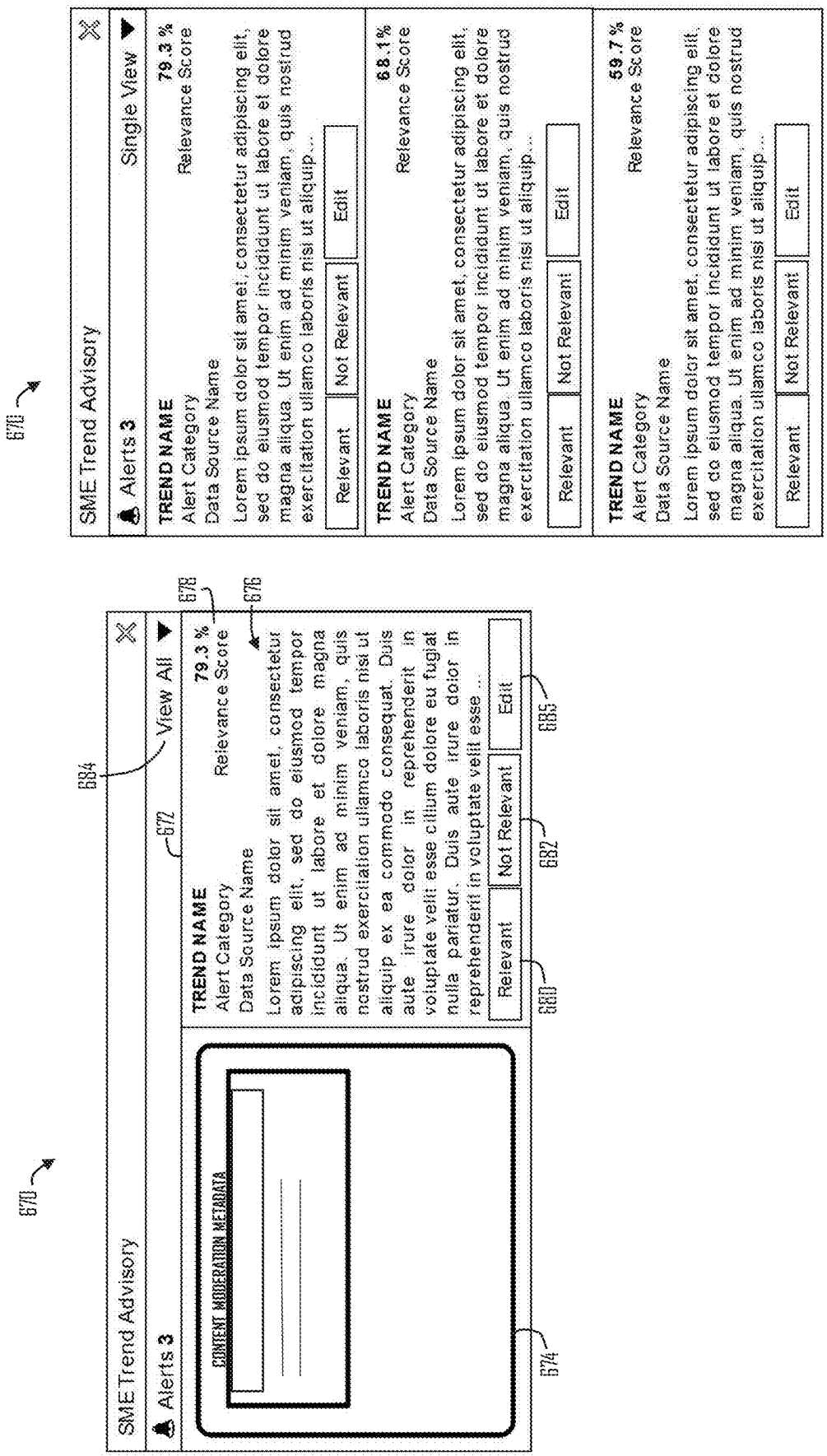
FIG. 6A is a schematic diagram of an embodiment of a graphical user interface of a trend advisory application engine, presented to a subject matter expert during content management activity.
Figure 6B:
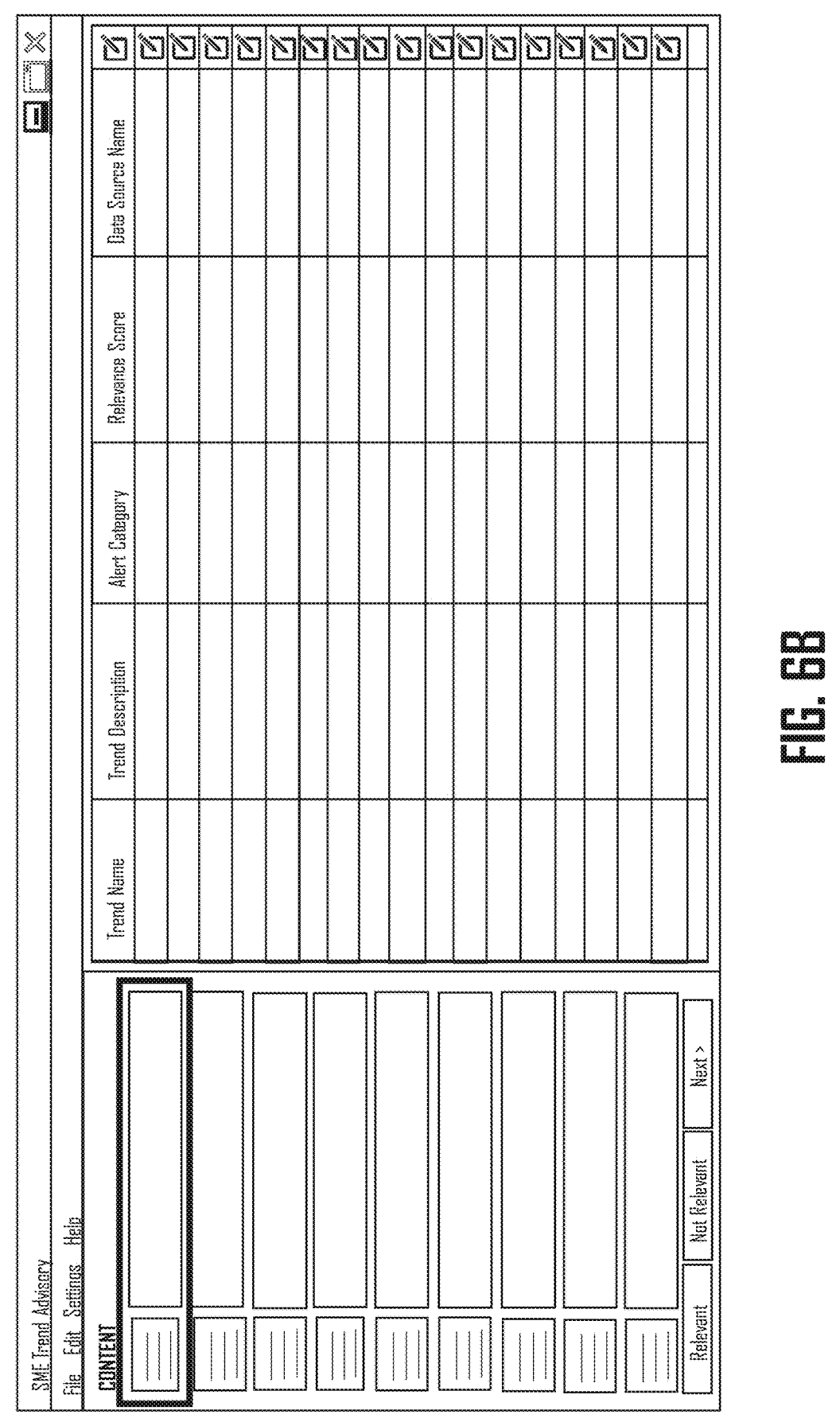
Figure 7A:
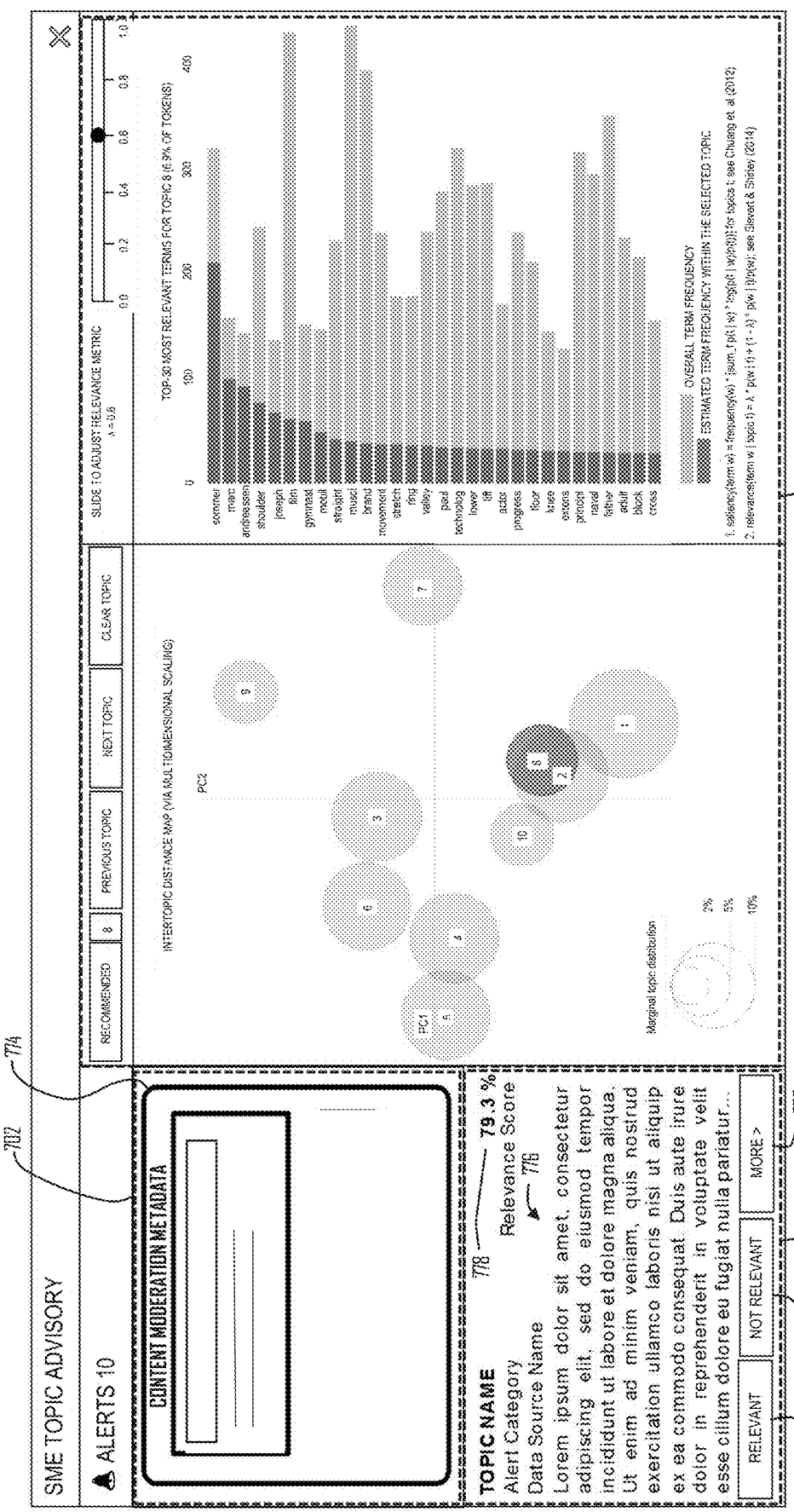
FIG. 7A is a schematic diagram of an embodiment of a graphical user interface for a topic advisory, presented to a subject matter expert during content management activity.

FIGS. 6A and 7A illustrate examples of an application interface that allows an SME to create and edit recommended trends, topics, and data sources. The advisory engine 300 may also allow a supervisor to interact and modify ongoing content management recommendation displays presented to reviewers as shown in FIGS. 6B-6C and FIGS. 7B-7C. The functions and features of the application interface 300 can be further customized to include a dynamic sequence of historical and ongoing content management activities along with trend and topic recommendations in a given user-defined time period. For instance, if the reviewer or SME wants to view recommendations for content management activity associated with police brutality in the last seven days, the trend and topic recommendations involving police brutality in the last seven days may be displayed in a sequential order. In some examples, a user or SME may be able to view multiple recommendations for multiple content management activities simultaneously in one application interface, thus allowing the user to draw conclusions on associations between content management and recommendation activity streams.

Referring to FIGS. 5-7C, embodiments may provide data process flows for advising subject matter experts on trends, topics, and data sources in real-time, during content management activities, and for receiving corresponding input from the subject matter experts. Embodiments may accomplish these functions through subject matter expert trend recommendation interfaces and subject matter expert topic recommendation interfaces, embodiments of which are outlined below.

SME Trend Recommendation Interface:

1. A user may interact with an interface, such as the example interface 670 illustrated in FIG. 6A, during a content management process.

2. A user may be presented with trend and data source recommendation features 672 overlaid on top, or displayed alongside, of the content management metadata 674 such as a current ongoing queue under user's content management review.

3. Along with the trend and data source recommendations, a user may be presented with a description 676 of the trend and a relevance score 678 that is measured using a pointwise lexicon-based classification approach.

4. As shown, user may be presented with candidate alert and alert categories that are relevant to the ongoing content management activity.

5. A user may be presented with example input features such as a "Relevant" button 680 and a "Not Relevant" button 682 to help the user categorize trend recommendations and provide relevancy feedback, and a "View All" button 684 to access and view more trend recommendations.

6. After a user selects the "View All" button 684, interface 670 may present the user with all possible trend recommendations, with trend recommendations that are also listed under alerts notification, as shown on the right side of FIG. 6A.

7. Interface 670 may also present a user with an additional administrative option, which provides a subject matter expert with administrative rights that are withheld from reviewers (e.g., read-write access for SMEs, as opposed to read-only access for reviewers). For example, interface 670 may provide an "Edit" button 685, which allows a user to review and modify trend recommendations for each content management activity, as illustrated in FIGS. 6B and 6C.

SME Topic Recommendation Interface:

1. A user may interact with an SME topic recommendation interface, such as the example interface 700 illustrated in FIG. 7A, during a content management process.

2. A user may be presented with topic and data source recommendation features 704 overlaid on top, or displayed alongside, of the content management metadata 774 such as a current ongoing queue under user's content management review.

3. Along with the topic and data source recommendations, a user may be presented with a description 776 of the topic and a relevance score 778 that is measured using a topic modeling machine-learning classification approach.

4. Interface 700 may also present a user with a topic modeling recommendation interface 706 along with top keywords that best describe a recommended topic.

5. As shown, a user may be presented with candidate alert and alert categories that are relevant to the ongoing content management activity.

6. A user may be presented with example input features such as a "Relevant" button 780 and a "Not Relevant" button 782 to help the user categorize trend recommendations and provide relevancy feedback, and a "View All" button (not shown) to access and view more trend recommendations.

7. After a user selects the "View All" button, interface 700 may present the user with all possible trend recommendations, with trend recommendations that are also listed under alerts notification.

Figure 7B:
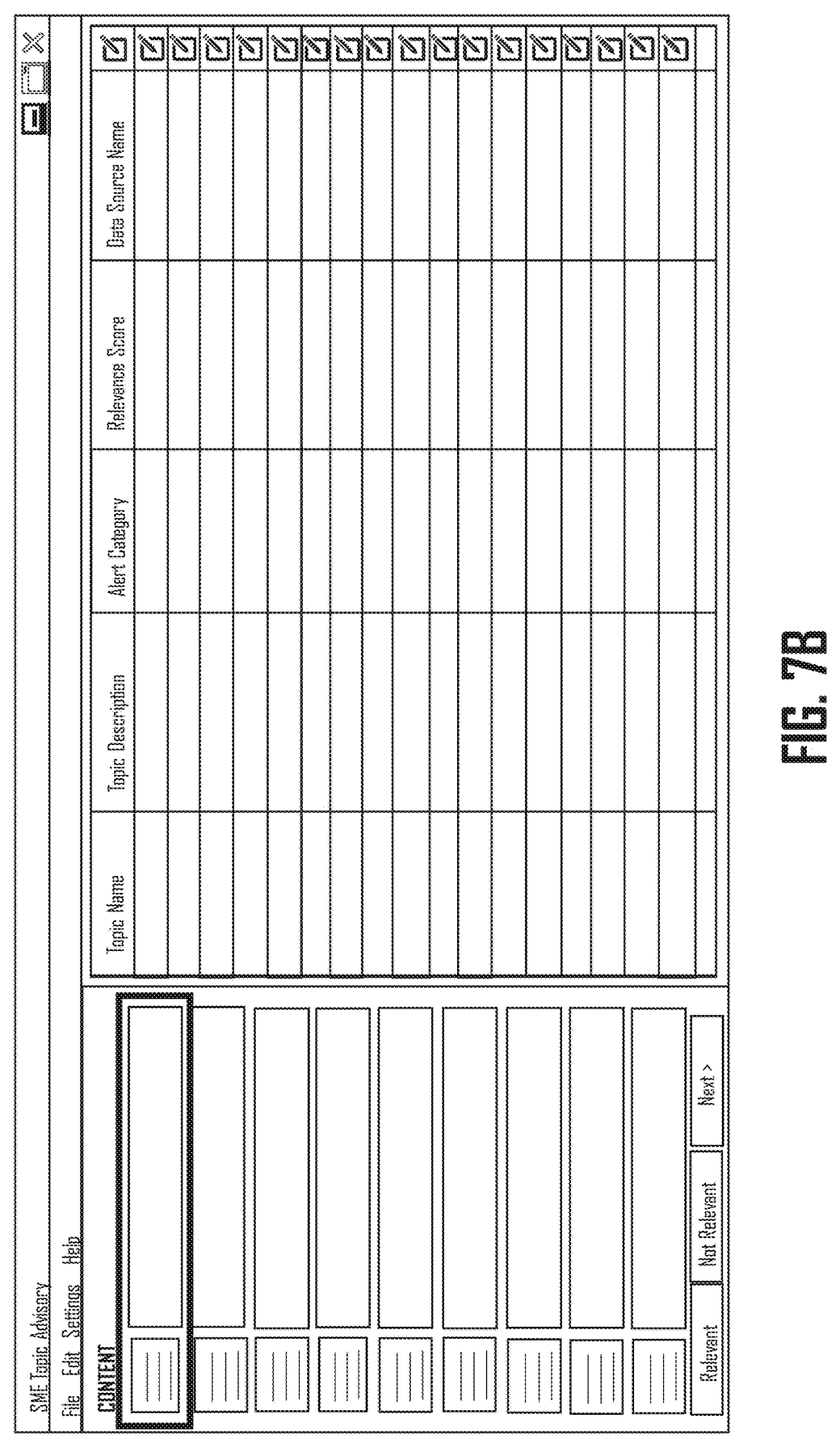

8. Interface 700 may also present a user with an additional administrative option, which provides a subject matter expert with administrative rights that are withheld from reviewers (e.g., read-write access for SMEs, as opposed to read-only access for reviewers). For example, interface 700 may provide an "Edit" button 785, which allows a user to review and modify trend recommendations for each content management activity, as illustrated in FIGS. 7B and 7C.

In embodiments, apart from the additional editing functions, the SME topic recommendation interface 700 may operate and interact in the same manner as described above for reviewer topic recommendation interface 400, and for brevity, will not be described in detail herein.

The implementations of content management advisory engines and the use of their above-described functions and features may assist reviewers and subject matter experts in reducing review time, increasing quality, and maintaining consistency in content decisioning. Content management centers are in need of operation channels through which entities can monitor, track, and manage the trends and signals impacting their content management activities, and can monitor, track, and manage metrics such as content volume, average handling time, quality of content review, reviewer performance. In addition to handling various content management requests, embodiments may allow content management centers to extract and recover useful information on events, news, and trends, using automated, sophisticated, algorithmic machine-learning methods and computations, to process signals impacting their content management activities. Improving the efficiency and effectiveness of content management processes may result in reduced operational costs and computing demand, and more successful processes such as better content handling time, content review quality, and reviewer performance.

The systems and methods described herein can be implemented in many different operation center environments to optimize business performance and service delivery. Examples of operation centers include business units conducting communications, media, banking, consumer goods, retail, travel, utilities, insurance, healthcare, and other services. Example use cases may be configured for (but not limited to) content management, community management, advertiser review, copyright infringement, branding and marketing, financial and economic assessment, and other operations. It is to be acknowledged that the descriptions and diagrams of the embodiments are intended to illustrate aspects of the embodiments, and not to limit their scope and application. Accordingly, notwithstanding the particular examples described herein, the present embodiments should be considered broadly applicable to optimizing operation centers.

As used in the present description and claims, the term "and/or" should be understood to include any combination of the listed features. For example, "A and/or B" should be understood to mean "only A, only B, or both A and B." Likewise, "A, B, and/or C" should be understood to mean "only A, only B, only C, both A and B, both A and C, both B and C, or all A, B, and C."

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A content management system comprising:
a data sourcing and data streaming engine that aggregates content data from data sources;
a trend detection and monitoring engine that matches data sources with content management metadata and provides relevance scoring of the content data; and
a trend recommendation and visualization engine that presents to a user, through a graphical user interface, an output comprising a relevance score and relevant trend, topic, and/or data source information, and receives from the user through the graphical user interface input and/or activity,
wherein the data sourcing and data streaming engine, the trend detection and monitoring engine, and/or the trend recommendation and visualization engine is updated with the input and/or activity for processing subsequent content data,
wherein the output presented by the trend recommendation and visualization engine through the graphical user interface comprises:
a content management display in which information about content being reviewed is displayed;
a suggested trend/topic display that:
displays the relevance score and the relevant trend, topic, and/or data source information, wherein the relevance score and the relevant trend, topic, and/or data source information are associated with the content being reviewed, and
provides an input tool for receiving the input and/or activity from the user; and a visualization display that displays a visualization of the relevance score and the relevant trend, topic, and/or data source information associated with the content being reviewed, wherein the relevance score and the relevant trend, topic, and/or data source information displayed by the suggested trend/topic display corresponds to a first trend/topic, wherein the visualization display displays the first trend/topic in the visualization along with a plurality of trends/topics, each associated with a different trend, topic, and/or data source information, wherein each different trend, topic, and/or data source information is associated with the content being reviewed, wherein the visualization display receives a selection of a second trend/topic of the plurality of trends/topics, and wherein the suggested trend/topic display responds to the selection by replacing the display of the first trend/topic with a display of a relevance score and relevant trend, topic, and/or data source information of the second trend/topic.

2. The system of claim 1, wherein the information about content being reviewed includes metadata of the content being reviewed.

3. The system of claim 1, wherein the input tool comprises a relevant button to indicate that the relevant trend, topic, and/or data source information of the first trend/topic is relevant to the content being reviewed, and a not relevant button to indicate that the relevant trend, topic, and/or data source information of the first trend/topic is not relevant to the content being reviewed.

4. The system of claim 3, wherein the input and/or activity comprises a selection of the relevant button or the not relevant button, and
   wherein the data sourcing and data streaming engine, the trend detection and monitoring engine, and/or the trend recommendation and visualization engine use the selection to process the subsequent content data.

5. The system of claim 1, wherein the input and/or activity comprises a decision to approve or reject content being reviewed,
   wherein the system transmits a decision communication to publish the content being reviewed when the decision is to approve, and
   wherein the system transmits a decision communication to withhold the content being reviewed when the decision is to reject.

6. The system of claim 1, wherein the system controls administrative rights of users,
   wherein when the user is a subject matter expert, the system receives from the subject matter expert editing input as part of the input and/or activity, and uses the editing input to edit information in the data sourcing and data streaming engine, the trend detection and monitoring engine, and/or the trend recommendation and visualization engine, and
   wherein when the user is a reviewer, the system restricts the reviewer from providing editing input.

7. The system of claim 6, wherein the system restricts the reviewer to providing only relevancy input.

8. A content management method comprising:
   aggregating content data from data sources;
   matching data sources with content management metadata and providing relevance scoring of the content data;
   presenting, through a graphical user interface, an output comprising a relevance score and relevant trend, topic, and/or data source information;
   receiving from a user through the graphical user interface input and/or activity; and
   using the input and/or activity for processing subsequent content data,
   wherein presenting the output comprises simultaneously displaying through the graphical user interface:
      a content management display in which information about content being reviewed is displayed;
      a suggested trend/topic display that:
         displays the relevance score and the relevant trend, topic, and/or data source information, wherein the relevance score and the relevant trend, topic, and/or data source information are associated with the content being reviewed, and
         provides an input tool for receiving the input and/or activity from the user; and
      a visualization display that displays a visualization of the relevance score and the relevant trend, topic, and/or data source information associated with the content being reviewed,
   wherein the relevance score and the relevant trend, topic, and/or data source information displayed by the suggested trend/topic display corresponds to a first trend/topic,
   wherein the visualization display displays the first trend/topic in the visualization along with a plurality of trends/topics, each associated with a different trend, topic, and/or data source information,
   wherein each different trend, topic, and/or data source information is associated with the content being reviewed,
   wherein the visualization display receives a selection of a second trend/topic of the plurality of trends/topics, and
   wherein the suggested trend/topic display responds to the selection by replacing the display of the first trend/topic with a display of a relevance score and relevant trend, topic, and/or data source information of the second trend/topic.

9. The method of claim 8, wherein the information about content being reviewed includes metadata of the content being reviewed.

10. The method of claim 8, wherein the input tool comprises a relevant button to indicate that the relevant trend, topic, and/or data source information of the first trend/topic is relevant to the content being reviewed, and a not relevant button to indicate that the relevant trend, topic, and/or data source information of the first trend/topic is not relevant to the content being reviewed.

11. The method of claim 10, wherein the input and/or activity comprises a selection of the relevant button or the not relevant button.

12. The method of claim 8, wherein the input and/or activity comprises a decision to approve or reject content being reviewed, and
   wherein the method further comprises:
      transmitting a decision communication to publish the content being reviewed when the decision is to approve, and
      transmitting a decision communication to withhold the content being reviewed when the decision is to reject.

13. The method of claim 8, wherein the user is a subject matter expert, and wherein the method further comprises controlling administrative rights between the subject matter expert and a second user that is a reviewer by:

receiving from the subject matter expert editing input as part of the input and/or activity, and using the editing input to edit information related to data sourcing and data streaming, trend detection and monitoring, and/or trend recommendation and visualization; and receiving from the reviewer relevancy input as part of the input and/or activity, and restricting the reviewer from providing editing input.

14. The method of claim 13, further comprising restricting the reviewer to providing only the relevancy input.

* * * * *

UNITED STATES PATENT AND TRADEMARK OFFICE
CERTIFICATE OF CORRECTION

PATENT NO. : 11,093,568 B2  
APPLICATION NO. : 16/926487  
DATED : August 17, 2021  
INVENTOR(S) : Guan et al.

Page 1 of 1

It is certified that error appears in the above-identified patent and that said Letters Patent is hereby corrected as shown below:

On the Title Page

Item (72) Inventors, Line 6, change "Mannbir" to --Maanbir--

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*